United States Patent

(12) United States Patent
Lai et al.

(10) Patent No.: US 11,317,037 B2
(45) Date of Patent: Apr. 26, 2022

(54) LIGHT-DETECTION DEVICE AND LIGHT-DETECTION METHOD FOR REDUCING POWER CONSUMPTION OF READ-OUT INTEGRATED CIRCUIT

(71) Applicant: InnoLux Corporation, Miao-Li County (TW)

(72) Inventors: Chun-Fu Lai, Miao-Li County (TW); Wen-Hao Kuo, Miao-Li County (TW)

(73) Assignee: INNOLUX CORPORATION, Miao-Li County (TW)

(*) Notice: Subject to any disclaimer, the term of this patent is extended or adjusted under 35 U.S.C. 154(b) by 229 days.

(21) Appl. No.: 16/353,021

(22) Filed: Mar. 14, 2019

(65) Prior Publication Data
US 2019/0301927 A1 Oct. 3, 2019

(30) Foreign Application Priority Data

Apr. 2, 2018 (CN) .......................... 201810284223.3

(51) Int. Cl.
*H04N 5/32* (2006.01)
*G01J 1/44* (2006.01)
(Continued)

(52) U.S. Cl.
CPC .................. *H04N 5/32* (2013.01); *G01J 1/44* (2013.01); *H04N 5/347* (2013.01); *G01T 1/2006* (2013.01); *G01T 1/208* (2013.01)

(58) Field of Classification Search
CPC .... G01J 1/44; G01J 1/16; G01T 1/208; G01T 1/2006; H04N 5/32; H04N 5/347;
(Continued)

(56) References Cited

U.S. PATENT DOCUMENTS 4,167,791 A * 9/1979 Banavar .................... G11C 7/04
257/1
5,914,485 A * 6/1999 Kobayashi ............... H04N 5/32
250/208.1
(Continued)

FOREIGN PATENT DOCUMENTS

CN 1753447 A 3/2006
CN 102230351 A 11/2011
(Continued)

OTHER PUBLICATIONS

Chinese language office action dated Dec. 16, 2020, issued in application No. CN 201810284223.3.
(Continued)

*Primary Examiner* — Jennifer D Bennett
(74) *Attorney, Agent, or Firm* — McClure, Qualey & Rodack, LLP

(57) ABSTRACT

A light-detection method for a light-detection device including a plurality of scan lines, a plurality of read-out lines and a plurality of photo sensing elements is provided. Each of the plurality of photo sensing elements is coupled to one of the plurality of scan lines and one of the plurality of read-out lines. The method includes simultaneously turning on at least two of the plurality of scan lines to turn on a portion of the plurality of photo sensing elements which are coupled to the turned-on scan lines, turning on at least one of the plurality of read-out lines to transmit signals of the portion of the plurality of photo sensing elements, and determining whether the signals match a trigger standard. When it is determined that the signals match the trigger standard, a reading mode is entered.

19 Claims, 7 Drawing Sheets

(51) Int. Cl.
*H04N 5/347* (2011.01)
*G01T 1/208* (2006.01)
*G01T 1/20* (2006.01)

(58) Field of Classification Search
CPC ........ H04N 5/341; H04N 5/345; H04N 5/343; H04N 5/378
See application file for complete search history.

(56) References Cited

U.S. PATENT DOCUMENTS

| | | | |
|---|---|---|---|
| 6,201,249 B1* | 3/2001 | Yamayoshi | A61B 6/00 250/370.09 |
| 6,343,112 B1* | 1/2002 | Petrick | A61B 6/00 378/207 |
| 7,773,078 B2 | 8/2010 | Lee et al. | |
| 2002/0176535 A1* | 11/2002 | Dixon | A61B 6/4233 378/62 |
| 2006/0060752 A1* | 3/2006 | Lee | G06F 3/042 250/208.1 |
| 2013/0004052 A1* | 1/2013 | Chen | G06T 7/251 382/132 |
| 2013/0140467 A1* | 6/2013 | Kitano | H01L 27/14676 250/393 |
| 2016/0178768 A1* | 6/2016 | Tredwell | G01T 1/247 250/252.1 |

FOREIGN PATENT DOCUMENTS

| | | |
|---|---|---|
| CN | 105389905 A | 3/2016 |
| CN | 106308834 A | 1/2017 |

OTHER PUBLICATIONS

Chinese Language Office Action dated Jul. 2, 2021 for the corresponding application No. 201810284223.3.

* cited by examiner

LIGHT-DETECTION DEVICE AND LIGHT-DETECTION METHOD FOR REDUCING POWER CONSUMPTION OF READ-OUT INTEGRATED CIRCUIT

CROSS REFERENCE TO RELATED APPLICATIONS

This Application claims priority of China Patent Application No. 201810284223.3, filed on Apr. 2, 2018, the entirety of which is incorporated by reference herein.

BACKGROUND OF THE DISCLOSURE

Field of the Disclosure

The disclosure relates to a light-detection device, and more particularly to a detection device that detects light and stores signals.

Description of the Related Art

With the development of technology, detection devices are being widely used in many technical fields, such as the visual entertainment field, the medical detection field, and the mobile electrical detection field. The appearance of detection devices has become more varied, and the functions performed by detection devices have increased. Application functions (e.g., detection sensitivity, response speed) of the detection devices attract attention. Current detection devices may comprise, for example, a light-detection function to detect ultraviolet light or infrared light. When the detection device detects light, the detection device determines whether the light matches a trigger standard according to the intensity of the light or the strength of the signal which is the result of converting the light. The detection device performs a corresponding response action according to the determination result. A conventional method to check whether the detection device can immediately perform the corresponding response action is to dispose many additional external detectors in the detection device. However, these additional detectors result in a higher cost for components. Additionally, the additional detectors can affect the efficiency of the detection device because the detection ranges of the external detectors are too narrow. Therefore, the detection device cannot immediately perform the corresponding response action. The ability of the detection device to immediately perform the corresponding response action needs to be improved without increasing the number of external detectors. Additionally, when the detection device detects light and obtains a detection result after a read mode, the detection result may be lost when the power supplied to the detection device is turned off suddenly or the power supplied to the detection device has an abnormal electric charge. Therefore, how the detection result is immediately processed or stored is a problem that needs to be overcome.

BRIEF SUMMARY OF THE DISCLOSURE

In accordance with an embodiment, a light-detection method for a light-detection device comprising a plurality of scan lines, a plurality of read-out lines and a plurality of photo sensing elements, wherein one of the plurality of photo sensing element is coupled to one of the plurality of scan lines and one of the plurality of read-out lines, comprises simultaneously turning on at least two of the plurality of scan lines to turn on a portion of the plurality of photo sensing elements coupled to the turned-on scan lines; turning on at least one of the plurality of read-out lines to transmit the signals of the portion of the plurality of photo sensing elements; determining whether the signals match a trigger standard; and entering a reading mode in response to the signals matching the trigger standard.

In accordance with a further embodiment, a light-detection device comprises a plurality of detection zones, a first control unit, and a second control unit. At least one of the plurality of the detection zones comprises a plurality of photo sensing elements configured to detect a light. The first control unit is coupled to the plurality of photo sensing elements. The second control unit is coupled to the plurality of photo sensing elements. In a detection mode, the first control unit simultaneously turns on at least one of the plurality of photo sensing elements in the at least one of the detection zones, and the second control unit reads the signal of the at least one of the plurality of photo sensing elements turned on by the first control unit.

In accordance with another embodiment, a light-detection device comprises a detection panel and a control unit. The control unit is coupled to the detection panel. The control unit comprises a processor and a storage element coupled to the processor. The storage element has non-volatile properties. The write cycle time of the storage element is less than or equal to 50 ns.

BRIEF DESCRIPTION OF THE DRAWINGS

The disclosure can be more fully understood by referring to the following detailed description and examples with references made to the accompanying drawings, wherein.

DETAILED DESCRIPTION OF THE DISCLOSURE

Figure 1:
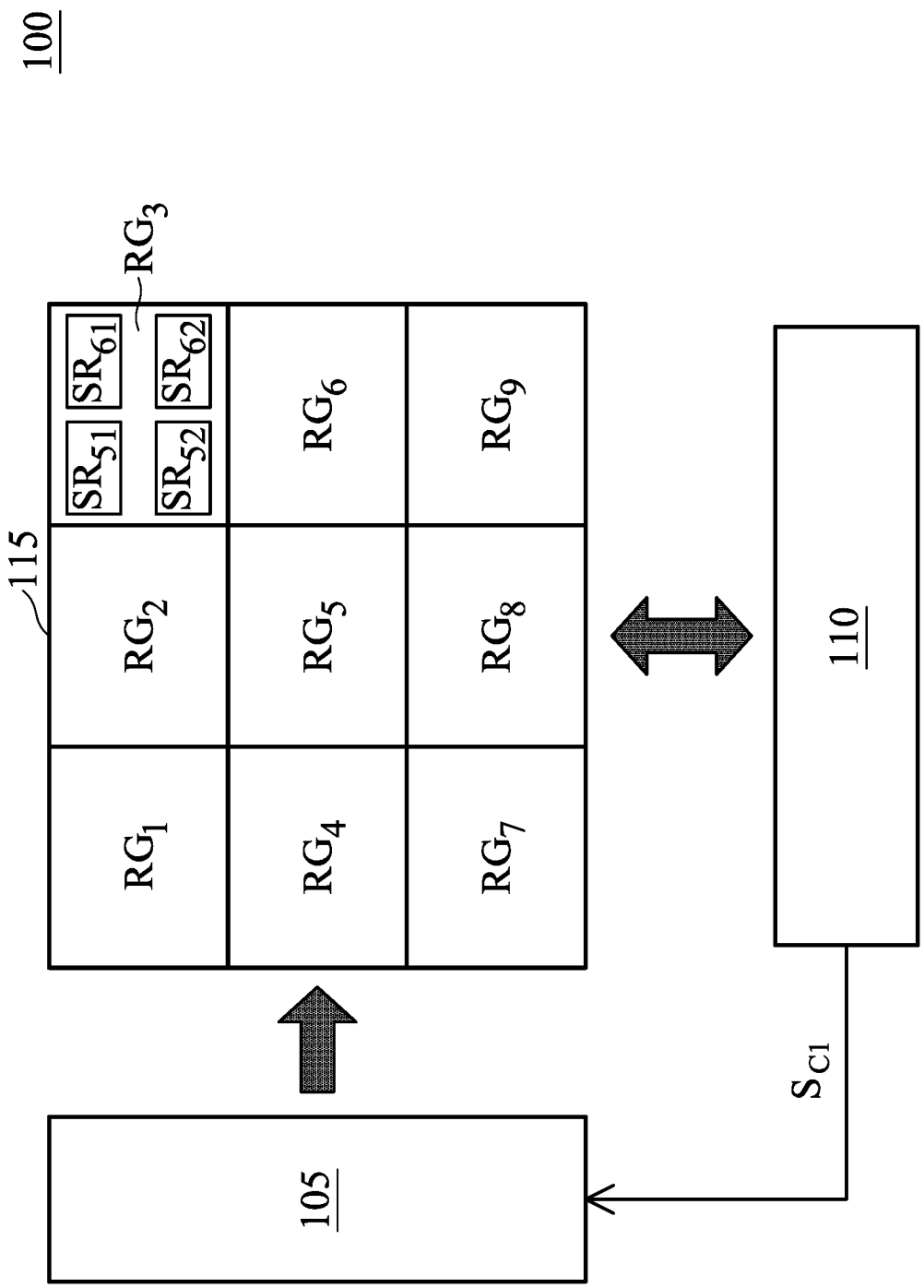
FIG. 1 is a schematic diagram of an exemplary embodiment of a light-detection device, according to various aspects of the present disclosure.

The present disclosure will be described with respect to particular embodiments and with reference to certain drawings, but the disclosure is not limited thereto and is only limited by the claims. The drawings described are only schematic and are non-limiting. In the drawings, the size of the elements may be exaggerated for illustrative purposes and not drawn to scale. The dimensions and the relative dimensions do not correspond to actual dimensions in the practice of the disclosure.

FIG. 1 is a schematic diagram of an exemplary embodiment of a light-detection device, according to various aspects of the present disclosure. As shown in FIG. 1, the light-detection device 100 may comprise a first control unit 105, a second control unit 110 and a detection panel 115. The disclosure does not limit the circuit structures of the first control unit 105 and the second control unit 110. In some embodiments, the first control unit 105 or the second control unit 110 may be integrated into the detection panel 115. For example, the detection panel 115 may comprise a substrate (not shown). The substrate may be divided into at least one detection zone and at least one non-detection zone. The first control unit 105 or the second control unit 110 may be disposed in the non-detection zone of the substrate. In some embodiments, the first control unit 105 or the second control unit 110 may be disposed in other elements disposed outside of the detection panel 115, but the disclosure is not limited thereto. The substrate may include a silicon wafer, a glass substrate, a sapphire substrate, a plastic substrate or other suitable materials, bur it not limited. The material of the substrate may include silicon carbide (SiC), gallium nitride (GaN), silicon dioxide (SiO2) or a combination thereof. In one embodiment, the material of the plastic substrate may be, for example, polyimide (PI), polyethylene terephthalate (PET) or polycarbonate (PC), but it is not limited thereto.

In some embodiments, the light-detection device 100 may be configured to detect light (e.g., ultraviolet light, infrared light or other light having other wavelengths or other wave bands or a combination thereof, but it is not limited thereto). In a detection mode, the second control unit 110 may be configured to determine whether an external light source (not shown) emits a light to the detection panel 115. When the external light source emits the light to the detection panel 115, and the detection panel 115 may convert the light into a signal, the signal may be read by the second control unit 110. The second control unit 110 determines whether the signal matches a trigger standard. When the signal matches the trigger standard, the light-detection device 100 may automatically enter a read mode to obtain the intensity of the light. In some embodiments, the detection panel 115 may convert the light into the electric charges, and the electric charges can be received by the second control unit 110. In some embodiments, the second control unit 110 may comprise an analog to digital converter (ADC) to convert analog signals into digital signals, but it is not limited thereto. In other embodiments, the second control unit 110 comprises a control device (not shown) or a control circuit (not shown) to process the digital signals, but it is not limited thereto.

The kind of light-detection device 100 is not limited in the present disclosure. In some embodiments, the light-detection device 100 may be an X-ray flat panel detection (FPD) device to detect X-rays. When the light-detection device 100 is an FPD device, the light-detection device 100 may comprise a scintillator layer (not shown). The scintillator layer is disposed on the detection panel, and the scintillator layer may be disposed between the detection panel and an X-ray tube. When the X-ray tube emits X-ray photons, these X-ray photons may pass through a target object. At this time, part of X-ray photons unabsorbed by the target object may enter the light-detection device 100, and part of X-ray photons entering the light-detection device 100 may hit the scintillator layer. The scintillator layer may convert the X-ray photons into visible-light photons. The visible-light photons may be converted by the detection panel 115 into the electric charges, and the electric charges may be stored in the detection panel 115. In a read mode, the electric charges may be read. In some embodiments, the scintillator layer may include cesium iodide (CsI), sodium iodide (NaI), thallium iodide (TlI) or other materials having good X-ray absorption characteristics, but it is not limited thereto. As shown in FIG. 1, the detection panel 115 may comprise detection zones and non-detection zones. The detection zones of the detection panel 115 may be the detection zone $RG_1$ to the detection zone $RG_9$. These detection zones ($RG_1 \sim RG_9$) may be configured to detect light. In some embodiments, the detection panel 115 may comprise more detection zones or fewer detection zones, but it does not limit. In some embodiments, one detection zone (such as the detection zone $RG_1$ to the detection zone $RG_9$) may comprise at least one photo sensing element. In some embodiments, one detection zone (such as the detection zone $RG_1$ to the detection zone $RG_9$) may comprise many photo sensing elements, and the photo sensing elements may be configured to detect light. The structures or arrangements of the photo sensing elements of the detection zone $RG_1$ to the detection zone $RG_9$ are the same, FIG. 1 only shows the structure of the detection zone $RG_3$. As shown in FIG. 1, the detection zone $RG_3$ may comprise the photo sensing element $SR_{51}$, the photo sensing element $SR_{61}$, the photo sensing element $SR_{52}$, and the photo sensing element $SR_{62}$, but it is not limited thereto. In other embodiments, one detection zone (such as the detection zone $RG_1$ to the detection zone $RG_9$) may comprise more photo sensing elements or fewer photo sensing elements. The number of photo sensing elements of one detection zone is not limited in the present disclosure. In some embodiments, the number of photo sensing elements in different detection zones (such as the detection zone $RG_1$ to the detection zone $RG_9$) may be different.

In some embodiments, the first control unit 105 may be coupled to the photo sensing elements in the detection zone $RG_1$ to the detection zone $RG_9$ through the scan lines. The light-detection device 100 may selectively turn on (or turn off) the photo sensing elements by the first control unit 105, but it is not limited thereto. In a detection mode, the first control unit 105 may selectively and simultaneously turn on at least two of the photo sensing elements, and the at least two of the photo sensing elements may be in the detection zone $RG_1$ to the detection zone $RG_9$. The turned-on photo sensing elements may be in different detection zones or the same detection zone, but it is not limited thereto. For example, the first control unit 105 may selectively and simultaneously turn on at least two photo sensing elements in the detection zone $RG_1$. In other embodiments, the first control unit 105 may selectively and simultaneously turn on at least one photo sensing element in the detection zone $RG_1$ and at least one photo sensing element in the detection zone $RG_2$, but it is not limited thereto. In some embodiments, the first control unit 105 selects many photo sensing elements, a portion of the selected photo sensing elements are in the detection zone $RG_1$, another portion of the selected photo sensing elements are in the detection zone $RG_7$, another portion of the selected photo sensing elements are in the detection zone $RG_3$, and the other portion of the selected photo sensing elements are in the detection zone $RG_9$, but it is not limited thereto. In some embodiments, the first control unit 105 selects many photo sensing elements, one of the selected photo sensing elements is in the detection zone $RG_1$, another of the selected photo sensing elements is in the detection zone $RG_7$, another of the selected photo sensing elements is in the detection zone $RG_3$, and the other of the selected photo sensing elements is in the detection zone $RG_9$, but it is not limited thereto. In some embodiments, the first control unit 105 may simultaneously turn on the photo sensing elements in the detection zone $RG_1$, the detection zone $RG_7$, the detection zone $RG_3$ and the detection zone $RG_9$, but it is not limited thereto.

In some embodiments, the second control unit 110 may control or read the signal of at least one photo sensing element in the detection zone $RG_1$ to the detection zone $RG_9$. In some embodiments, in the detection mode, the second control unit 110 may read the signals of the photo sensing elements turned on by the first control unit 105. These signals may be accumulated or calculated by an integrator circuit of the second control unit 110 to generate a detection value. In some embodiments, in the detection mode, the first control unit 105 may simultaneously turn on at least two of photo sensing elements. The turned-on photo sensing elements may be in at least one of the detection zone RG1 to the detection zone RG9. At this time, the second control unit 110 may selectively read the signal of at least one of the photo sensing elements turned on by the first control unit 105. For example, the second control unit 110 may selectively read the signal of at least one of the photo sensing element $SR_{51}$, the photo sensing element $SR_{52}$, the photo sensing element $SR_{61}$ and the photo sensing element $SR_{62}$ in the detection zone RG3 to generate a detection value. In the detection mode, the second control unit 110 may determine whether the intensity of the light matches a trigger standard according to the detection value. When the detection value does not match the trigger standard, it means that an external light source does not emit light or the detected signal is caused by a noise or background light. When the detection value matches the trigger standard, it means that the external light has emitted light to the light-detection device 100 (e.g., an X-ray FPD device). Therefore, the light-detection device 100 can enter a read mode. In the read mode, the first control unit 105 may turn on at least one photo sensing element in the detection zones (such as the detection zone $RG_1$ to the detection zone $RG_9$) in sequence according to a predetermined timing, but it is not limited thereto. For example, the first control unit 105 may sequentially turn on the photo sensing elements in the detection zone $RG_1$ to the detection zone $RG_9$ according to a predetermined timing, but it is not limited thereto.

In other embodiment, in the read mode, the first control unit 105 may be divided into a first part (not shown) and a second part (not shown). The first part may be coupled to the photo sensing elements of the detection zones arranged in the odd columns, such as the photo sensing elements of detection zone $RG_1$ to the detection zone $RG_3$ and detection zone $RG_7$ to the detection zone $RG_9$. The second part may be coupled to the photo sensing elements of the detection zones arranged in the even column, such as the photo sensing elements of the detection zone $RG_4$ to the detection zone $RG_6$. In some cases, the first part may sequentially turn on the photo sensing elements of the detection zones arranged in one odd column (such as the detection zone $RG_1$ to the detection zone $RG_3$) and the photo sensing elements of the detection zones arranged in another odd column (such as the detection zone $RG_7$ to the detection zone $RG_9$) according to a first predetermined timing. Furthermore, the second part may sequentially turn on the photo sensing elements of the detection zones arranged in the even column (such as the detection zone $RG_4$ to the detection zone $RG_6$) according to a second predetermined timing, but it is not limited thereto. The first part and the second part of the first control unit 105 may operate at the same time or separately operate, but it is not limited thereto. The second control unit 110 may read the signals of the photo sensing elements of the detection zone $RG_1$ to the detection zone $RG_9$ turned on by the first control unit 105, and the second control unit 110 may process the signals, but it is not limited thereto. In some embodiments, before entering the read mode, the light-detection device 100 may wait a buffer time. Therefore, before entering the read mode, the light-detection device 100 has enough time to confirm that the detection action has been finished and stopped, but it is not limited thereto. After the buffer time, the second control unit 110 may provide a control signal $S_{C1}$ to the first control unit 105. In some embodiments, after the control signal $S_{C1}$ has been received by the first control unit 105, the first control unit 105 may sequentially turn on the photo sensing elements of the detection zone $RG_1$ to the detection zone $RG_9$ according to the control signal $S_{C1}$. At this time, the second control unit 110 may read the signals of the photo sensing elements in the detection zone $RG_1$ to the detection zone $RG_9$, and the second control unit 110 may process or determine the signals, but it is not limited thereto. Taking an X-ray FPD device as an example, the X-ray may be transformed by a scintillator layer into visible-light photons. The visible-light photons can be received by the photo sensing elements. These visible-light photons can be stored in the photo sensing elements and transformed into the electric charges. The electric charges can be read by the second control unit 110. In the detection mode, the first control unit 105 may simultaneously turn on the photo sensing elements in some detection zones. The second control unit 110 may receive or read the signals (such as electric charges) of the turned-on photo sensing elements, and the second control unit 110 may process the signals to generate a detection value. Then, the second control unit 110 determines whether the detection value reaches or matches a trigger condition. When the detection value reaches or matches the trigger condition, it means that an external light source emitted X-ray to the X-ray FPD device. At this time, the X-ray FPD device is capable of entering the read mode. In the read mode, the first control unit 105 may sequentially turn on the photo sensing elements in the detection zones according to a predetermined timing, and the second control unit 110 may receive or read these signals generated by the photo sensing elements turned on by the first control unit 105, but it is not limited thereto. In some embodiments, in the read mode, the first control unit 105 may turn on the photo sensing elements in the detection zones according to a predetermined sequence which is different from the sequence from the scan line $SL_1$ to the scan line $SL_6$.

In some embodiments, in the read mode, the second control unit 110 may perform a compensation action (e.g. to compensate signals). For example, the second control unit 110 compensates the signals of the photo sensing elements which are turned on by the first control unit 105 and are read by the second control unit 110 in the detection mode. In some embodiments, the compensation methods may calculate and obtain compensation values for the photo sensing elements turned on by the first control unit 105 in the detection mode according to some parameters, these parameters may comprise the ratio (e.g. the ratio of first duration to second duration) of the duration (referred to as the first duration) when the light-detection device 100 operates in the detection mode to the duration (referred to as the second duration) when the light-detection device 100 operates in the read mode, the intensity of the light to be emitted by an external light source, or the duration when the light illuminated the light-detection device 100, but it is not limited thereto. For example, the duration in the detection mode is 0.05 times the duration in the read mode. In the detection mode, the signals of the photo sensing elements may be selectively turned on and read. Therefore, in the read mode, the signals of the photo sensing elements turned on in the detection mode are compensated according to a compensation value. In one embodiment, the intensity of the light emitted to the light-detection device 100 is calculated to obtain a corresponding electric charge or a corresponding signal, and the electric charge or the signal may be multiplied by 0.05, which is a ratio of the duration in the detection mode to the duration in the read mode, to obtain the compensation value. In the present disclosure, how to obtain the compensation value is not limited. The compensation method is changed according to other parameters.

Since the first control unit 105 may simultaneously turn on at least two scan lines, the photo sensing elements coupled to the turned-on scan lines may detect whether an external light source emits light. Therefore, no additional photo sensing element is required to be disposed in the light-detection device 100, or no additional photo sensing element is disposed on a printed circuit board below the detection panel 115, but it is not limited thereto. Therefore, the component cost may be reduced, the complexity of the process may be reduced and the sensing resolution of the detection panel 115 may be maintained. Furthermore, in the detection mode, the first control unit 105 may turn on some photo sensing elements to reduce the power consumption or the time required for the detection mode. In some embodiments, the first control unit 105 may dynamically select some detection zones to be turned on or dynamically select scan lines (e.g., at least two scan lines) to be turned on. In some embodiments, the second control unit 110 may dynamically select a read-out line (e.g. at least one read-out line) to be turned on. The turned-on read-out line transmits the signals of the photo sensing elements, and the photo sensing elements are coupled to the turned-on read-out line to the second control unit. Using the above method, the photo sensing elements in different detection zones may be turned on or read in the detection mode according to requirements. If the scan lines are turned on one by one, the time required for the detection mode may be increased or the power consumption may be increased. Therefore, the flexibility application of the light-detection device may be increased, the time required for the detection mode may be reduced or the consumption of the light-detection device may be reduced.

Figure 2:
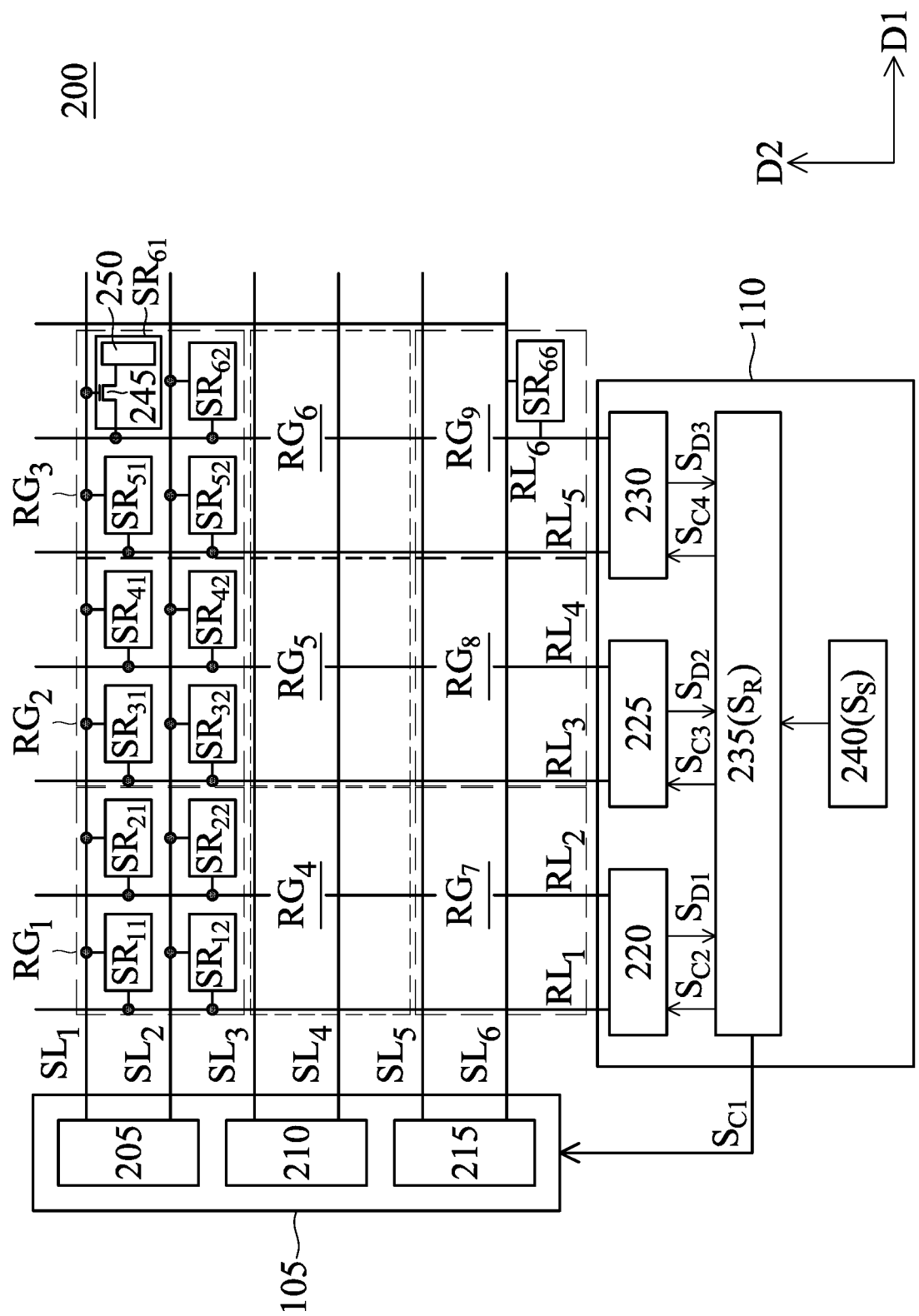
FIG. 2 is a schematic diagram of another exemplary embodiment of the light-detection device, according to various aspects of the present disclosure.

FIG. 2 is a schematic diagram of another exemplary embodiment of the light-detection device according to various aspects of the present disclosure. In some embodiments, the light-detection device 200 may comprise scan line SL1 to the scan line SL6 and read-out lines RL1 to the read-out line RL6. The scan line SL1 to the scan line SL6 extend sequentially in a first direction D1, and the scan line SL1 to the scan line SL6 may be adjacent to each other in a second direction D2. The scan line SL1 to the scan line SL6 may be coupled to the first control unit 105. Furthermore, the read-out line RL1 to the read-out line RL6 extend sequentially in the second direction D2, and the read-out line RL1 to the read-out line RL6 may be adjacent to each other in the first direction D1. The read-out line RL1 to the read-out line RL6 may be coupled to the second control unit 110. The first direction D1 is different from the second direction D2. In some embodiments, the first direction D1 intersects the second direction D2, and an angle is between the first direction D1 and the second direction D2. For example, the angle between the first direction D1 and the second direction D2 may be in a range from 80 degrees to 90 degrees (80°≤angle≤90°), but it is not limited thereto. The photo sensing element SR11 to the photo sensing element SR66 may be coupled to a corresponding scan line and a corresponding read-out line. The photo sensing element SR11 to the photo sensing element SR66 may be turned on or off according to the signal transmitted by the corresponding scan line. The signals of the photo sensing elements (such as the photo sensing element SR11 to the photo sensing element SR66) may be transmitted to the second control unit 110 through the corresponding read-out lines. Taking the photo sensing element SR61 as an example, the photo sensing element SR61 may be coupled to the scan line SL1 and the read-out line RL6. In this case, the photo sensing element SR61 may comprise a switching transistor 245 and a photo sensor 250, but it is not limited. The switching transistor 245 may include an amorphous silicon thin-film transistor, a poly-silicon thin-film transistor (e.g., a low temperature poly-silicon thin film transistor; LTPS), an indium gallium zinc oxide (IGZO) thin-film transistor or other applicable materials, but it is not limited thereto. In some embodiments, the switching transistor 245 may turn on or off the photo sensor 250 according to the electric charges or signal transmitted by the scan line SL1. When the photo sensor 250 is turned on, the signal of the photo sensor 250 may be transmitted to the second control unit 110 through the read-out line RL6. The second control unit 110 may read or process the signal of the photo sensor 250. The photo sensor 250 may be a photodiode, but it is not limited thereto. The photodiode may include a PIN structure comprising a p-type semiconductor layer, an active layer and an n-type semiconductor layer. The photodiode may include a NIP structure comprising an n-type semiconductor layer, an active layer and a p-type semiconductor layer. The material of the p-type semiconductor layer may comprise amorphous silicon semiconductor doping the group IIIB elements, for example, B, Al, Ga or other applicable elements. The material of the n-type semiconductor layer may comprise amorphous silicon semiconductor doping the group VB elements, for example, N, P, As or other applicable elements or a combination of N, P, and As, but it is not limited thereto. In the present disclosure, the structure of the photo sensor 250 or the switching transistor 245 in the photo sensing element SR11 to the photo sensing element SR66 is not limited.

In some embodiments, the first control unit 105 may comprise a first scan driving circuit 205, a second scan driving circuit 210 and a third scan driving circuit 215, but it is not limited thereto. In some embodiments, the first scan driving circuit 205, the second scan driving circuit 210 and the third scan driving circuit 215 may comprise a gate driver respectively. The number of scan driving circuits is not limited in the present disclosure. In other embodiments, the first control unit 105 may comprise more scan driving circuits or fewer scan driving circuits. In some embodiments, the first scan driving circuit 205 is coupled to the scan lines $SL_1$ and $SL_2$ to turn on the photo sensing elements in the detection zone $RG_1$ to the detection zone $RG_3$, such as the photo sensing element $SR_{11}$ to the photo sensing element $SR_{62}$. In such cases, the scan line $SL_1$ and the scan line $SL_2$ may be referred to as a first scan line. In other embodiments, the first scan driving circuit 205 may be coupled to more scan lines or fewer scan lines. In some embodiments, the number of scan lines coupled to the first scan driving circuit may be 512. When the first scan driving circuit 205 turns on the scan line $SL_1$, the photo sensing element $SR_{11}$ to the photo sensing element $SR_{61}$ coupled to the scan line $SL_1$ are turned on.

Similarly, the second scan driving circuit 210 may be coupled to the scan line $SL_3$ and the scan line $SL_4$ to turn on the photo sensing elements in the detection zone $RG_4$ to the detection zone $RG_6$. In this case, the scan line $SL_3$ and the scan line $SL_4$ is referred to as a second scan line. The number of scan lines coupled to the second scan driving circuit 210 is not limited in the present disclosure. In other embodiments, the second scan driving circuit 210 may be coupled to more scan lines or fewer scan lines. In some embodiments, the number of scan lines coupled to the second scan driving circuit 210 may be 512. Additionally, the number of scan lines coupled to the second scan driving circuit 210 may be the same as or different than the number of scan lines coupled to the first scan driving circuit 205. Since the operation of the second scan driving circuit 210 is the same as the operation of the first scan driving circuit 205, the description of the operation of the second scan driving circuit 210 is omitted.

The third scan driving circuit 215 may be coupled to the scan lines $SL_5$ and $SL_6$ to turn on the photo sensing elements in the detection zone $RG_7$ to the detection zone $RG_9$. In this case, the scan line $SL_5$ and the scan line $SL_6$ are referred to as a third scan line. The number of scan lines coupled to the third scan driving circuit 215 is not limited in the present disclosure. In other embodiments, the third scan driving circuit 215 may be coupled to more scan lines or fewer scan lines. In some embodiments, the number of scan lines coupled to the third scan driving circuit 215 may be 512. Additionally, the number of scan lines coupled to the third scan driving circuit 215 may be the same as or different than the number of scan lines coupled to the first scan driving circuit 205 or the second scan driving circuit 210. Since the operation of the third scan driving circuit 215 is the same as the operation of the first scan driving circuit 205, the description of the operation of the third scan driving circuit 215 is omitted.

In the detection mode, the first control unit 105 may selectively and simultaneously turn on at least two scan lines. The turned-on scan lines may be coupled to the same scan driving circuit or different scan driving circuits. In other embodiments, the number of scan lines turned by at least one of the first scan driving circuit 205, the second scan driving circuit 210 and third scan driving circuit 215 may be different from the number of scan lines turned by another of the remaining of the first scan driving circuit 205, the second scan driving circuit 210 and third scan driving circuit 215. In some embodiments, the first scan driving circuit 205 may turn on the scan line $SL_1$ and the scan line $SL_2$, the second scan driving circuit 210 may not turn on any scan lines coupled to the second scan driving circuit 210, and the third scan driving circuit 215 may turn on the scan line $SL_5$, but it is not limited thereto. The word "simultaneously" means that there may be a time gap of less than 10 us. The time gap is between a time point of turning on one scan line and a time point of turning on another scan line. For example, the first scan driving circuit 205 turns on the scan line $SL_1$ in a first time point and turns on the scan line $SL_2$ in a second time point. In this case, when a time gap between the first time point and the second time point is less than 10 us, it means that the scan line $SL_1$ and the scan line $SL_2$ are turned on simultaneously.

In some embodiments, the first scan driving circuit 205, the second scan driving circuit 210 and the third scan driving circuit 215 may independently control or operate. For example, the first scan driving circuit 205, the second scan driving circuit 210 and the third scan driving circuit 215 may be controlled by different control signals. In some embodiments, the operation sequence or the timing of the first scan driving circuit 205, the second scan driving circuit 210 and the third scan driving circuit 215 is not limited. Therefore, the operation of the first scan driving circuit 205 does not relate to the operation of the second scan driving circuit 210 and the operation of the third scan driving circuit 215. Similarly, the operation of the second scan driving circuit 210 does not relate to the operation of the first scan driving circuit 205 and/or the operation of the third scan driving circuit 215, and the operation of the third scan driving circuit 215 does not relate to the operation of the first scan driving circuit 205 and/or the operation of the second scan driving circuit 210, but it is not limited thereto. In some embodiments, the first control unit 105 may comprise a single scan driving circuit. In this case, the single scan driving circuit may be coupled to the scan line $SL_1$ to the scan line $SL_6$.

In some embodiments, the second control unit 110 may comprise a first read-out integrated circuit 220, a second read-out integrated circuit 225, a third read-out integrated circuit 230, a first processor 235 and a second processor 240. The number of read-out integrated circuit (ROIC) is not limited in the present disclosure. In other embodiments, the second control unit 110 may comprise more read-out integrated circuits or fewer read-out integrated circuits. In some cases, the first read-out integrated circuit 220 may be coupled to the read-out line $RL_1$ and read-out line $RL_2$. The read-out line $RL_1$ and the read-out line $RL_2$ may transmit signals of the photo sensing elements coupled to the read-out line $RL_1$ or the read-out line $RL_2$, to the second control unit 110. In some embodiments, the signals of the photo sensing elements may be transmitted to the first processor 235, but the disclosure is not limited thereto. Furthermore, the reading time of the read-out integrated circuit is about less than 100 us for one time. In some embodiments, the reading time of the read-out integrated circuit is about 12 us for one time, but the disclosure is not limited thereto. Therefore, when at least two scan lines are simultaneously turned on to turn on many photo sensing elements, the number of times that the read-out integrated circuit to turn on the read-out lines transmitting the signals of the photo sensing elements is reduced, so the time required for the detection mode may be reduced or the power consumption of the read-out integrated circuit may be reduced, but the disclosure is not limited thereto.

For example, when the first scan driving circuit 205 turns on the scan line $SL_1$, the photo sensing elements $SR_{11}$ to the photo sensing element $SR_{61}$ coupled to the scan line $SL_1$ may be turned on. When the first read-out integrated circuit 220 turns on the read-out line $RL_1$, the read-out line $RL_1$ may transmit, for example, the signals of the photo sensing element $SR_{11}$ to the first read-out integrated circuit 220. The number of read-out lines turned on by the first read-out integrated circuit 220 is not limited in the present disclosure. In other embodiments, the first read-out integrated circuit 220 turns on at least one of the read-out line $RL_1$ and the read-out line $RL_2$ according to a control signal $S_{C2}$. In this case, the read-out line $RL_1$ and the read-out line $RL_2$ are referred to as a first read-out line.

The number of read-out lines coupled to the first read-out integrated circuit 220 is not limited in the present disclosure. In other embodiment, the first read-out integrated circuit 220 may be coupled to more read-out lines or fewer read-out lines. In some embodiments, the number of the read-out lines coupled to the first read-out integrated circuit 220 may be 256. In some embodiments, the first read-out integrated circuit 220 may turn on, at least one read-out line in the detection mode. In some embodiments, the first read-out integrated circuit 220 may turn on all read-out lines in the detection mode, but the disclosure is not limited thereto.

The circuit structure of the first read-out integrated circuit 220 is not limited in the present disclosure. In some embodiments, the first read-out integrated circuit 220 may comprise an integrator (not shown) and an analog to digital converter (not shown), but it is not limited thereto. The integrator may accumulate the electric charges transmitted by the read-out lines, and then the analog to digital converter may convert the electric charges into a signal $S_{D1}$, and then the signal $S_{D1}$ may be transmits to the first processor 235. In some embodiments, the signal $S_{D1}$ may be a digital signal, but the disclosure is not limited thereto.

Similarly, the second read-out integrated circuit 225 may be coupled to the read-out line $RL_3$ and the read-out line $RL_4$. The read-out line $RL_3$ and the read-out line $RL_4$ may transmit the signals of the photo sensing elements coupled to the read-out line $RL_3$ or the read-out line $RL_4$ to the second read-out integrated circuit 225. In some embodiments, the second read-out integrated circuit 225 may turn on at least one of the read-out line $RL_3$ and the read-out line $RL_4$ according to a control signal $S_{C3}$. In this case, the read-out line $RL_3$ and the read-out line $RL_4$ can be referred to as a second read-out line. Since the operation of the second read-out integrated circuit 225 is the same as the operation of the first read-out integrated circuit 220, the description of the operation of the second read-out integrated circuit 225 is omitted.

Similarly, the third read-out integrated circuit 230 may be coupled to the read-out line $RL_5$ and the read-out line $RL_6$. The read-out line $RL_5$ and the read-out line $RL_6$ may transmit the signals of the photo sensing elements coupled to the read-out line $RL_5$ or the read-out line $RL_6$ to the third read-out integrated circuit 230. In some embodiments, the third read-out integrated circuit 230 may turn on at least one of the read-out line $RL_5$ and the read-out line $RL_6$ according to a control signal $S_{C4}$. In this case, the read-out line $RL_5$ and the read-out line $RL_6$ can be referred to as a third read-out line. Since the operation of the third read-out integrated circuit 230 is the same as the operation of the first read-out integrated circuit 220, the description of the operation of the third read-out integrated circuit 230 is omitted.

In the detection mode, the first processor 235 generates a detection value $S_R$ according to at least one of the signal $S_{D1}$ to the signal $S_{D3}$. The signal $S_{D1}$ to the signal $S_{D3}$ are digital signals. For example, in the detection mode, when the first processor 235 turns on the first read-out integrated circuit 220 through the control signal $S_{C2}$, the first processor 235 generates a detection value $S_R$ according to the signal $S_{D1}$ output from the read-out integrated circuit 220. In this case, the signal $S_{D1}$ may be transmitted by the read-out line $RL_1$ or the read-out line $RL_2$, but the disclosure is not limited thereto. In other embodiments, when the first processor 235 turns on the first read-out integrated circuit 220 and the third read-out integrated circuit 230 through the control signal $S_{C2}$ and $S_{C4}$ respectively, the first processor 235 generates another detection value $S_R$ according to the signal $S_{D1}$ transmitted by the first read-out integrated circuit 220 or the signal $S_{D3}$ transmitted by the third read-out integrated circuit 230, but the disclosure is not limited thereto.

The first processor 235 may determine whether the detection value $S_R$ matches a trigger standard. When the detection value $S_R$ matches the trigger standard, it means that the light has been received by the light-detection device 200. Therefore, the light-detection device 200 enters a read mode. At this time, the first processor 235 may transmit a control signal $S_{C1}$ to the first control unit 105 and control the first control unit 105. In some embodiments, the first control unit 105 may turn on at least one scan line according to the control signal $S_{C1}$. In some embodiments, the first control unit 105 may sequentially turn on all scan lines according to the control signal $S_{C1}$. The first processor 235 turns on the first read-out integrated circuit 220, the second read-out integrated circuit 225 and the third read-out integrated circuit 230 according to the control signal $S_{C2}$ to the control signal $S_{C4}$ respectively, the read-out lines coupled to the first read-out integrated circuit 220, the second read-out integrated circuit 225 and the third read-out integrated circuit 230 may be turned on. The turned-on read-out lines may transmit the signals to the first read-out integrated circuit 220, the second read-out integrated circuit 225 and/or the third read-out integrated circuit 230 respectively.

In some embodiments, when the detection value SR matches a trigger standard, the first processor 235 may transmit a control signal SC1 to the first control unit 105 after first buffer time. Additionally, when the detection value SR matches the trigger standard, the first processor 235 transmits the control signal SC2 to control signal SC4 to the first read-out integrated circuit 220, the second read-out integrated circuit 225 and the third read-out integrated circuit 230 respectively after second buffer time, but the disclosure is not limited thereto. The duration of the first buffer time may be the same as or different than the duration of the second buffer time. For example, when the detection value $S_R$ matches the trigger standard, the first processor 235 may output the control signal $S_{C1}$ to the control signal $S_{C4}$ simultaneously after the buffer time. In this case, the control signal $S_{C1}$ is provided to the first control unit 105, the control signal $S_{C2}$ is provided to the first read-out integrated circuit 220, the control signal $S_{C3}$ is provided to the second read-out integrated circuit 225, and the control signal $S_{C4}$ is provided to the third read-out integrated circuit 230. Furthermore, the circuit structure of the first processor 235 is not limited in the present disclosure. In some embodiments, the first processor 235 may include a field-programmable gate array (FPGA). The field-programmable gate array may control the operations of the scan driving circuits or read-out integrated circuits. In some embodiments, the first processor 235 may include a microcontroller unit (MCU), but it is not limited thereto.

A setting parameter $S_S$ may be pre-stored in the second processor 240. In this case, the setting parameter $S_S$ may be a predetermined value. The setting parameter $S_S$ may relate to an intensity of the light emitted to the light-detection device 200, a direction of the light emitted toward the light-detection device 200 or other factors, but the disclosure is not limited thereto. In some embodiments, the setting parameter SS may be pre-written into the second processor 240. In some embodiments, the first processor 235 may generate the control signal SC2 to control signal SC4 according to the setting parameter SS. When the first read-out integrated circuit 220, the second read-out integrated circuit 225 and the third read-out integrated circuit 230 receive the control signal $S_{C2}$ to control signal $S_{C4}$ respectively, the first read-out integrated circuit 220, the second read-out integrated circuit 225 and the third read-out integrated circuit 230 may determine a number of read-out lines turned on according to the control signal $S_{C2}$ to the control signal $S_{C4}$ respectively, but the disclosure is not limited thereto. The above second processor 240 may store a setting parameter $S_S$ in advance, and then modulate the setting parameter $S_S$ according to the operation mode (such as the detection mode, the read mode or other modes) of the light-detection device 200. For example, in the detection mode, the first processor 235 may generate the control signal $S_{C1}$ according to the setting parameter $S_S$. When the first control unit 105 receives the control signal $S_{C1}$, the first control unit 105 may selectively and simultaneously turn on at least two scan lines, but the disclosure is not limited thereto. Additionally, in the read mode, the first processor 235 may generates the control signal $S_{C1}$ according to the setting parameter $S_S$. When the first control unit 105 receives the control signal $S_{C1}$, the first control unit 105 may operate according to a control clock. In some embodiments, when the first control unit 105 receives the control clock, the first control unit 105 may turn on all scan lines according to a predetermined sequence, but the disclosure is not limited thereto. Similarly, in the detection mode, the first processor 235 may generate the control signal $S_{C2}$ to the control signal $S_{C4}$ according to the setting parameter $S_S$. When the first read-out integrated circuit 220, the second read-out integrated circuit 225 and the third read-out integrated circuit 230 receive the control signal $S_{C2}$ to control signal $S_{C4}$, the first read-out integrated circuit 220, the second read-out integrated circuit 225 and the third read-out integrated circuit 230 may selectively turn on at last read-out line respectively, but the disclosure is not limited thereto. Furthermore, in the read mode, the first processor 235 may generate the control signal $S_{C2}$ to the control signal $S_{C4}$ according to the setting parameter $S_S$. When the first read-out integrated circuit 220, the second read-out integrated circuit 225, and the third read-out integrated circuit 230 receive the control signal $S_{C2}$ to the control signal $S_{C4}$ respectively, the first read-out integrated circuit 220, the second read-out integrated circuit 225 and the third read-out integrated circuit 230 may turn on all read-out lines, but the disclosure is not limited thereto.

For example, when the intensity of the light emitted by an external light source is weak, the setting parameter $S_S$ may be set to a first value. In this case, in the detection mode, the first control unit 105 may simultaneously turn on more scan lines, or more photo sensing elements are turned on. In other embodiments, in the detection mode, the second control unit 110 may turn on more read-out lines. On the contrary, when the intensity of the light emitted by an external light source is strong, the setting parameter $S_S$ may be set to a second value. In this case, in the detection mode, the first control unit 105 may simultaneously turn on fewer scan lines, or fewer photo sensing elements are turned on. In other embodiments, the second control circuit 110 may turn on fewer read-out lines in the detection mode. Therefore, the setting parameter $S_S$ is adjusted to dynamically determine the number of scan lines or the read-out lines to be turned on. Additionally, the setting parameter $S_S$ may dynamically turn on scan lines or the read-out lines in different detection zones. The detection flexibility application of the light-detection device 200 may be increased. In some embodiments, the setting parameter $S_S$ may be adjusted by the user.

Figure 3:
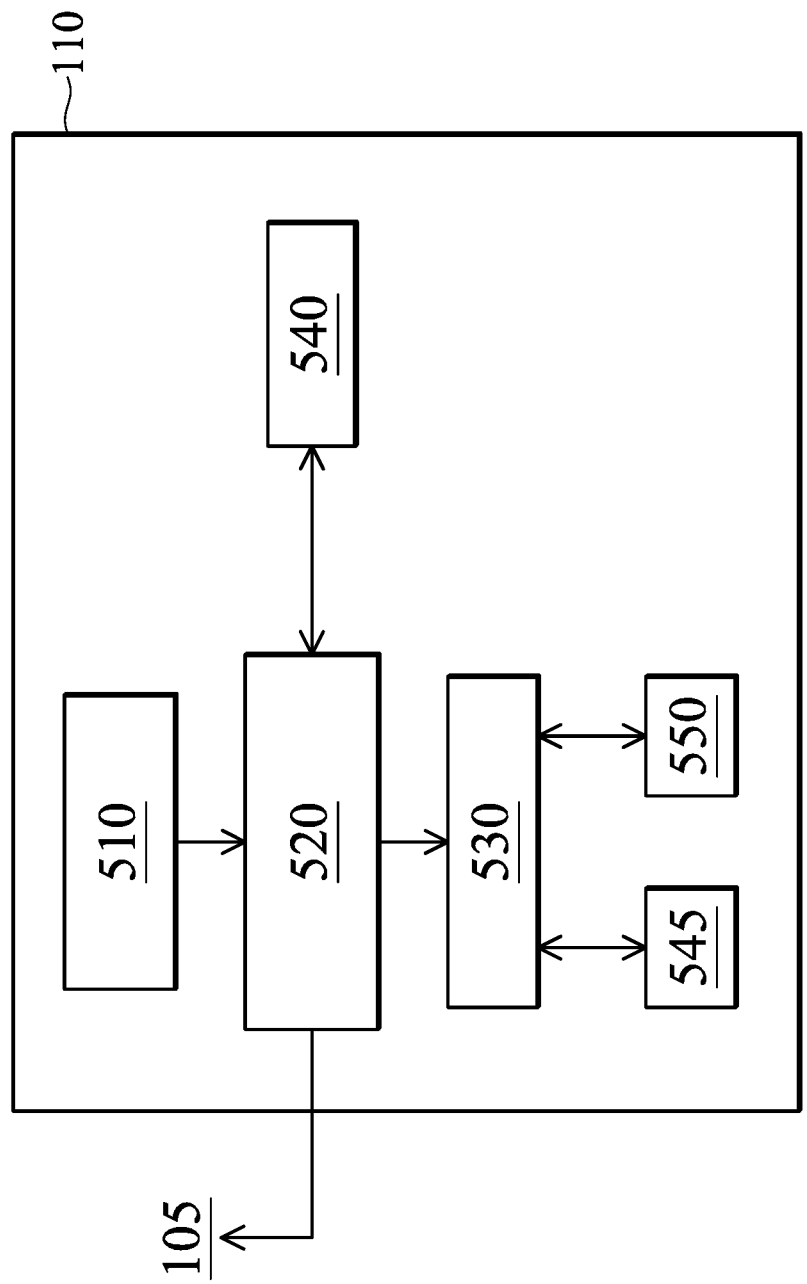
FIG. 3 is a schematic diagram of an exemplary embodiment of a second control unit, according to various aspects of the present disclosure.

FIG. 3 is a schematic diagram of an exemplary embodiment of the second control unit 110 according to various aspects of the present disclosure. The second control circuit 110 may comprise a read-out integrated circuit 510, a first processing part 520 and at least one storage element 540. The read-out integrated circuit 510 may comprise the first read-out integrated circuit 220, the second read-out integrated circuit 225 and the third read-out integrated circuit 230, but the disclosure is not limited thereto. The first processing part 520 may comprise the first processor 235 and the second processor 240, but the disclosure is not limited thereto. The storage element 540 may be coupled to the first processor 235 of the first processing part 520. The first control unit 105 may be coupled to the first processor 235 of the first processing part 520, but the disclosure is not limited thereto. Additionally, in some embodiments, the second control circuit 110 may further comprise a second processing part 530, a storage element 545 and a storage element 550. The storage element 540 and the storage element 550 are coupled to the second processing part 530, but the disclosure is not limited thereto. For example, after finishing a read action, the first processing part 520 may transmit the signal read and processed by the first processing part 520 to the storage element 540. Then, the storage element 540 stores the signal. The storage element 540 may include a non-volatile storage element. The non-volatile storage element may write data or read data with fast speed. In some embodiments, the storage element 540 may include a storage element having a write cycle time less than or equal to 50 ns (nanosecond). In some embodiments, the storage element 540 may include a storage element having a write cycle time less than or equal to 10 ns. In some embodiments, the storage element 540 may include a storage element having a write cycle time between 5 ns to 10 ns (5 ns≤write cycle time≤10 ns). In some embodiments, the storage element 540 may include a storage element having a write cycle time less than or equal to 5 ns, but the disclosure is not limited thereto. The above write cycle times may be a time when the digital value of one bit is written into the storage element 540. In some embodiments, the storage element 540 may include a storage element having a read cycle time less than or equal to 50 ns. In some embodiments, the storage element 540 may include a storage element having a read cycle time less than or equal to 10 ns, but the disclosure is not limited thereto. The above read cycle times may be a time when the digital value of one bit is read from the storage element 540. In some embodiments, the storage element 540 may include a magnetoresistive random access memory (MRAM), but the disclosure is not limited thereto. The life time of the MRAM is long, and the MRAM has fast speed to store data. Additionally, the storage element 545 may include a storage element, which may store data fast and have large storage capacity. Furthermore, in some embodiments, the storage element 545 may include a storage element having a write cycle time less than or equal to 50 ns. In some embodiments, the storage element 545 may include a storage element having a write cycle time less than or equal to 10 ns. In some embodiments, the storage element 540 may include a storage element having a write cycle time between 5 ns to 10 ns (5 ns≤write cycle time≤10 ns). In some embodiments, the storage element 545 may include a storage element having a write cycle time less than or equal to 5 ns, but the disclosure is not limited thereto. In some embodiments, the storage element 540 may include a storage element having a read cycle time less than or equal to 50 ns. In some embodiments, the storage element 545 may include a storage element having a read cycle time less than or equal to 10 ns. The storage element 545 may be a storage element having a storage capacity larger than 2 gigabit (Gbit), but the disclosure is not limited thereto. In some embodiments, the storage element 545 may be a storage element having a storage capacity larger than 8 gigabit (Gbit). In some embodiments, the storage element 545 may be a double data rate synchronous dynamic random access memory (DDR), a static random access memory (SRAM) or other storage element with similar efficacy, but the disclosure is not limited thereto. Additionally, the storage element 550 may be a non-volatile storage element having a large storage capacity. In some embodiments, the storage element 550 may be a storage element having a storage capacity larger than 2 gigabit (Gbit), but the disclosure is not limited thereto. In some embodiments, the storage element 550 may be a storage element having a storage capacity larger than 8 gigabit (Gbit). In some embodiments, the storage element 550 may include a flash memory or other storage element which has efficacy similar to the flash memory, but the disclosure is not limited thereto. In some embodiments, the second control circuit 110 may further comprise more storage elements.

As shown in FIG. 3, when the first processing part 520 processes the signals and transmits the signals to the storage element 540, the first processing part 520 may simultaneously transmit the signals to the second processing part 530 for performing some image processes (e.g., 3D image processes, but the disclosure is not limited thereto). In some embodiments, the second processing part 530 may include a graphics processing unit (GPU) or other processors for processing image, but the disclosure is not limited thereto. Then, the image processed by the second processing part 530 may be transmitted to the storage element 545 for storing the image fast. Then, the image processed by the second processing part 530 may be transmitted to the storage element 550. Since the storage capacity of the storage element 550 is larger, the storage element 550 may store many images. Furthermore, because the storage element 550 has non-volatile properties, the images stored by the storage element 550 can still be stored when power is turned off, but the disclosure is not limited thereto. In some embodiments, after the first processing part 520 transmits signals to the second processing part 530, the second processing part 530 performs some image processes for the signals to generate processed images. Then, the second processing part 530 may transmit the processed images to the storage element 545 or 550, but the disclosure is not limited thereto. Therefore, the above embodiments may reduce a risk of losing signal data or image when the power supplying is suddenly turned off or abnormal. Additionally, the second processing part 530 may include an advanced RISC machine (ARM) or other applicable communication devices, but the disclosure is not limited thereto. The ARM may include a 32 bits of RISC processor, which may be applied in a mobile communication field. In this case, the light-detection device may connect to or communicate with other devices by the RISC. The light-detection device may connect to or communicate with other devices by a wired method or a wireless method, but the disclosure is not limited thereto.

Figure 4:
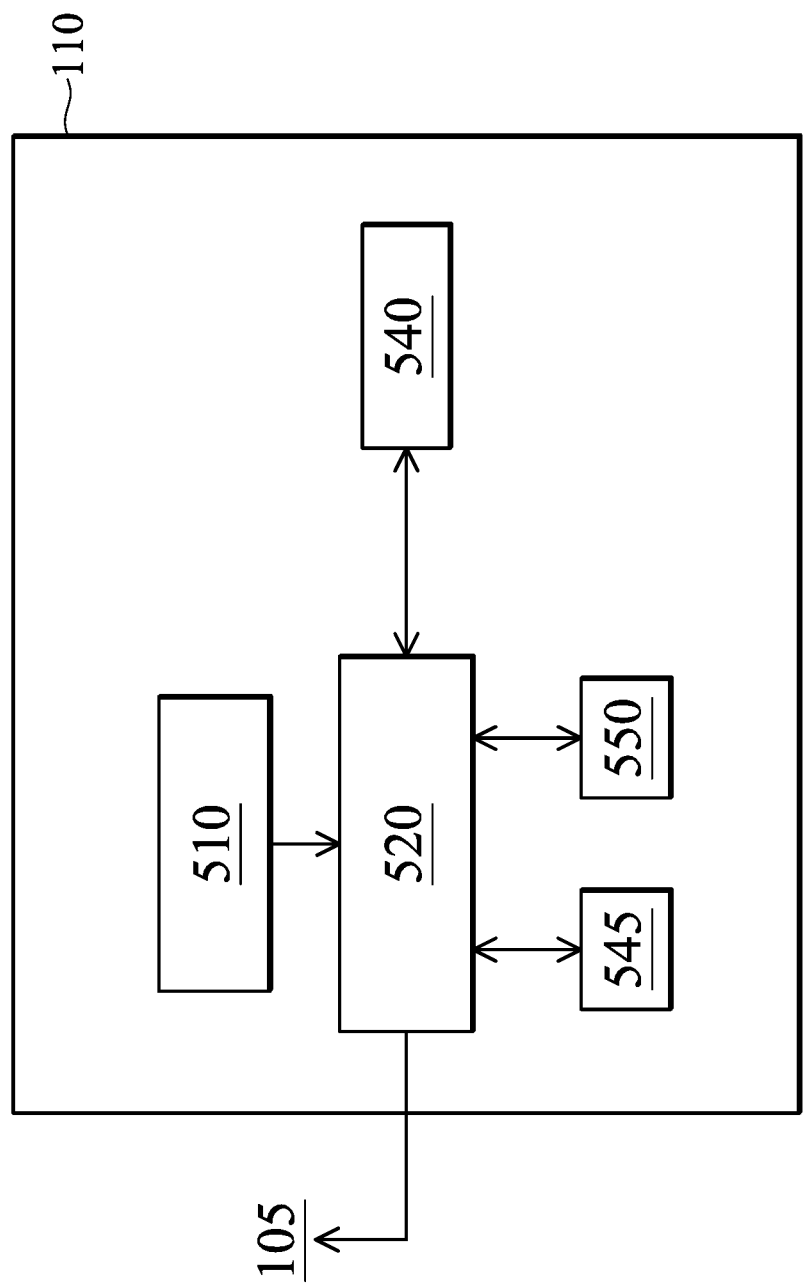
FIG. 4 is a schematic diagram of another exemplary embodiment of the second control unit, according to various aspects of the present disclosure.

FIG. 4 is a schematic diagram of another exemplary embodiment of the second control unit 110 according to various aspects of the present disclosure. FIG. 4 is similar to FIG. 3 with the exception that the second control unit 110 shown in FIG. 4 omits the second processing part 530. In some embodiments, the storage element 540, the storage element 545 and the storage element 550 may be coupled to the first processing part 520, but the disclosure is not limited thereto. In some embodiments, the first processing part 520 may couple more storage elements or fewer storage elements. For example, the first processing part 520 may couple to the storage element 540. The second control unit 110 of FIG. 4 may be applied to transmit or store simple images, but the disclosure is not limited thereto. In other words, in FIG. 4, the second processing part 530 is not required to process or calculate high-level diagnostic images. Since the second processing part 530 is omitted in FIG. 4, the power consumption or processing time of the light-detection device may be reduced because the turn-on time of the second processing part 530 may be 15 seconds, but the disclosure is not limited thereto.

The second control unit 110 shown in FIG. 3 or FIG. 4 comprises the storage element 540, the storage element 540 may be a non-volatile storage element, and the storage element 540 may couple to the first processing part 520. Therefore, when the light-detection device processes or stores images, a risk of losing images can be reduced if the power supplying to the light-detection device is suddenly turned off or abnormal.

Figure 5:
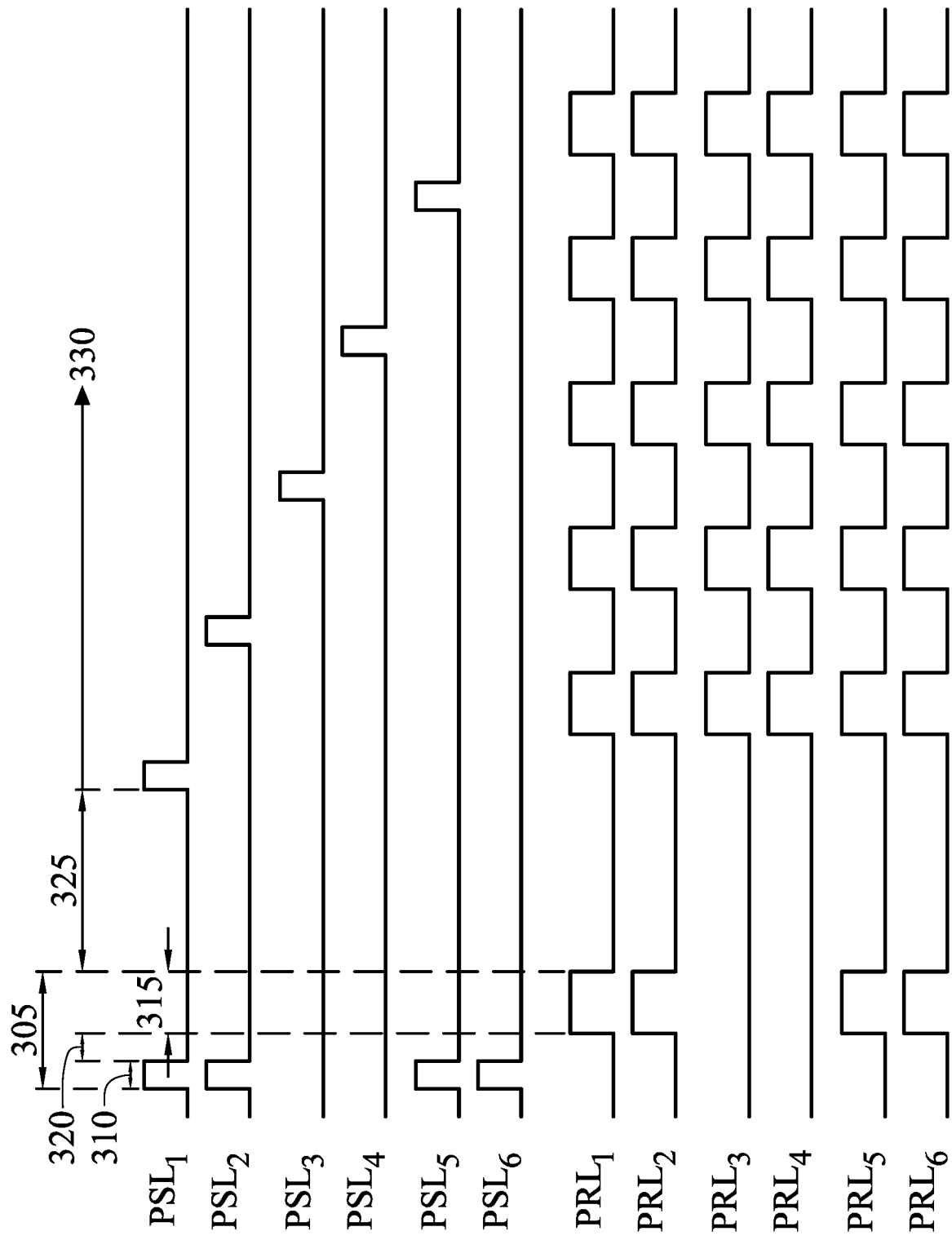
FIG. 5 is a timing chart of an exemplary embodiment of the light-detection device, according to various aspects of the present disclosure.

FIG. 5 is a timing chart of an exemplary embodiment of the light-detection device, according to various aspects of the present disclosure. The symbols $PSL_1$~$PSL_6$ may respectively represent a turn-on timing of the scan lines (such as the scan line $SL_1$ to the scan line $SL_6$). The symbols $PRL_1$~$PRL_6$ may respectively represent the read-out timing of the read-out lines (such as the read-out line $RL_1$ to the read-out line $RL_6$). In some cases, in a first period 310 of a detection period 305, the first scan driving circuit 205 may turn on the scan line $SL_1$ and the scan line $SL_2$ to turn on the photo sensing elements coupled to the scan line $SL_1$ and the scan line $SL_2$, and the third scan driving circuit 215 may turn on the scan line $SL_5$ and the scan line $SL_6$ to turn on the photo sensing elements coupled to the scan line $SL_5$ and the scan line $SL_6$. In the first period 310, the second scan driving circuit 210 may turn off, the scan line $SL_3$ and the scan line $SL_4$. In a second period 315 of the detection period 305, the first read-out integrated circuit 220 may turn on the read-out line $RL_1$ and the read-out line $RL_2$ and read the signals transmitted by the read-out line $RL_1$ and the read-out line $RL_2$, and the third read-out integrated circuit 230 may turn on the read-out line $RL_5$ and read-out line $RL_6$ and read signals transmitted by the read-out line $RL_5$ and the read-out line $RL_6$. In this case, a time gap 320 may be between the first period 310 and the second period 315. The duration of the time gap 320 is not limited in the present disclosure. In some embodiments, the time gap 320 may be omitted or removed. In some embodiments, the detection period 305 (including the first period 310, the time gap 320 and the second period 315) may be less than 100 us (microsecond). In some embodiments, the detection period 305 may be less than 20 us, but the disclosure is not limited thereto.

Furthermore, in the detection mode, when the detection value reaches or matches a trigger standard, the read mode is entered to perform a read-out action. There is a buffer period 325 before the read-out action is performed. For example, in the buffer period 325, the first control unit 105 may not turn on any scan line, and the second control unit 110 does not turn on any read-out line, and stop reading the signal of any photo sensing element. In some embodiments, the duration of the buffer period 325 may be between 1 ms (milliseconds) to 10 seconds (1 ms≤buffer period 325≤10 seconds). In some embodiments, the duration of the buffer period 325 may be between 1 ms to 3 seconds (1 ms≤buffer period 325≤3 seconds), but the disclosure is not limited thereto. In some embodiments, the duration of the buffer period 325 may be less than 1 ms. In other words, when the detection value reaches the trigger standard in the detection mode, the read mode is entered immediately.

When the detection value SR reaches the trigger standard, the first processor 235 may control the photo sensors to perform a read action. In a read period 330, the first control unit 105 may operate according to a control clock to sequentially turn on the scan line SL1 to the scan line SL6. For example, the first control unit 105 may sequentially turn on the scan line SL1, the scan line SL2, the scan line SL3, the scan line SL4, the scan line SL5 and the scan line SL6 but the disclosure is not limited thereto. Referring to FIG. 2 and FIG. 3, when the scan line SL1 is turned on, the read-out line RL1 to the read-out line RL6 may be simultaneously turned on by the first read-out integrated circuit 220, the second read-out integrated circuit 225 and the third read-out integrated circuit 230. The read-out line RL1 to the read-out line RL6 transmit the signals of the photo sensing elements coupled the corresponding read-out line to the first read-out integrated circuit 220, the second read-out integrated circuit 225 and the third read-out integrated circuit 230. Then, the first control unit 105 may turn on the scan line SL2. At this time, the read-out line RL1 to the read-out line RL6 are simultaneously turned on by the first read-out integrated circuit 220, the second read-out integrated circuit 225 and the third read-out integrated circuit 230 for reading the signals of the photo sensing elements coupled to the corresponding read-out line until. All scan lines have been turned on sequentially by the first control unit 105, but the disclosure is not limited thereto.

In some embodiments, as discussed above, the first processor 235 may additionally perform a compensation action. For example, the first processor 235 performs the compensation action for the signals of the photo sensing elements read by the first read-out integrated circuit 220, the second read-out integrated circuit 225 and the third read-out integrated circuit 230. The compensation action has been described as reflected above. In other embodiments, in the read period 330, the first control unit 105 may turn on the scan line SL1 to the scan line SL6 according to a random sequence or a predetermined sequence, but the disclosure is not limited thereto. The duration of the read period 330 may be greater than 100 ms, but the disclosure is not limited thereto.

In some embodiments, when the detection value $S_R$ reaches the trigger standard, a discharge action may be performed before the read mode (i.e. the read period 330). The discharge action may discharge the photo sensing elements, but the disclosure is not limited thereto. For example, while performing the discharge action, the light-detection device may turn on for discharging the electric charges in the photo sensing elements. The ground lines (not shown) may be coupled to the photo sensing elements for discharging, or other paths may be coupled between the photo sensing elements and ground for discharging, but the disclosure is not limited thereto. If the discharge action is performed, the compensation action may be not required in the read mode, but the disclosure is not limited thereto. In some embodiments, a discharge action may be performed before the read mode. Since the photo sensing elements have been discharged, it may be considered to compensate the electric charges of the photo sensing elements according to the charge loss of the photo sensing elements. The compensation amount may be similar as discussed above to calculate the intensity of the light emitted by an external light source to obtain corresponding electric charges or signal values and then to multiply the electric charges or signal values by a time ratio. The time ratio may be a ratio of time required in the discharge action to the time required in the read mode, but the disclosure is not limited thereto. The compensation action can be adjusted according to other factors. The time required in the discharge action may be less than or equal to 5 us, but the disclosure is not limited thereto.

Figure 6:
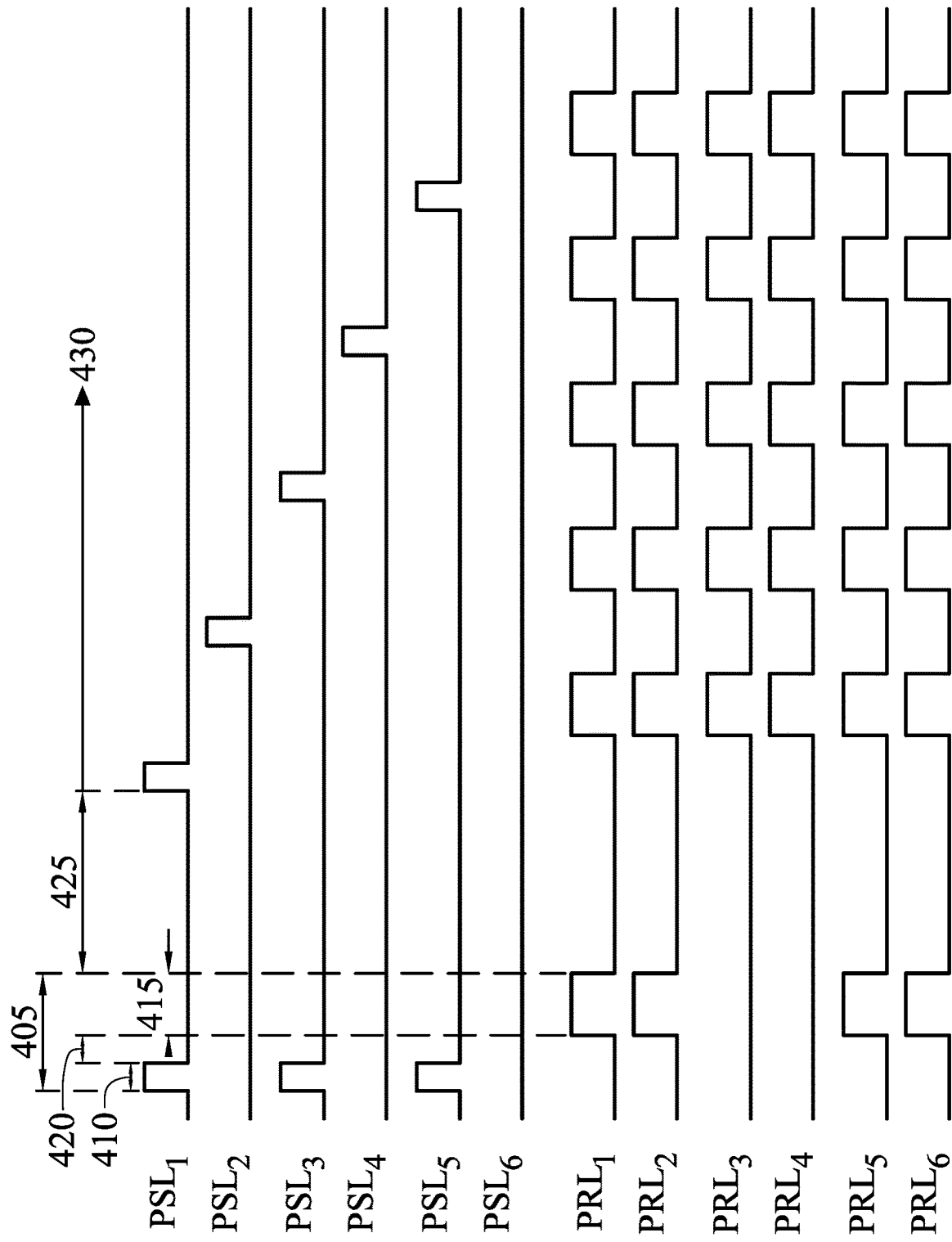
FIG. 6 is a timing chart of another exemplary embodiment of the light-detection device, according to various aspects of the present disclosure.

FIG. 6 is a timing chart of another exemplary embodiment of the light-detection device according to various aspects of the present disclosure. In a first period 410 of a detection period 405, the first scan driving circuit 205, the second scan driving circuit 210 and the third scan driving circuit 215 may simultaneously operate. The first scan driving circuit 205 may turn on the scan line $SL_1$. The second scan driving circuit may turn on the scan line $SL_3$. The third scan driving circuit 215 may turn on the scan line $SL_5$. At this time, the first scan driving circuit 205 may turn off the scan line $SL_2$. The second scan driving circuit 210 may turn off the scan line $SL_4$. The third scan driving circuit 215 may turn off the scan line $SL_6$. Then, in the second period 415 of the detection period 405, the first read-out integrated circuit 220 and the third read-out integrated circuit 230 may turn on the read-out lines coupled to the first read-out integrated circuit 220 and/or the third read-out integrated circuit 230 and then may receive the signals of the photo sensing elements through the read-out lines turned by the first read-out integrated circuit 220 and the third read-out integrated circuit 230. In this case, a time gap 420 may occur between the first period 410 and the second period 415. The duration of the time gap 420 is not limited in the present disclosure. In some embodiments, the predetermined time gap 420 can be omitted or removed. In some embodiments, the detection period 405 (including the first period 410, the time gap 420 and the second period 415) may be less than 20 us, but the disclosure is not limited thereto.

FIG. 6 is similar to FIG. 5 to show a buffer period 425 before the read period 430. In the buffer period 425, the first control unit may turn off the scan lines, and the second control unit 110 may turn off the read-out lines to stop reading the signals of the photo sensing elements. The duration of the buffer period 425 may be the same as the duration of the buffer period 325, thus, the description of the buffer period 425 is omitted.

The buffer period 325 or the buffer period 425 contributes to measure whether the detection action is finished, even to measure whether the discharge action is finished before the read period 430.

Additionally, in the read period 430, if a scan line is turned on, the first read-out integrated circuit 220, the second read-out integrated circuit 225 and the third read-out integrated circuit 230 may simultaneously turn on and receive the signals transmitted by the read-out line $RL_1$ to the read-out line $RL_6$. In some embodiments, in the read period 430, the time points when the first read-out integrated circuit 220, the second read-out integrated circuit 225, and the third read-out integrated circuit 230 turn on and read the signals transmitted by the read-out line $RL_1$ to the read-out line $RL_6$ may be different, but the disclosure is not limited thereto. The above two timing charts are given as examples, but the disclosure is not limited thereto.

Figure 7:
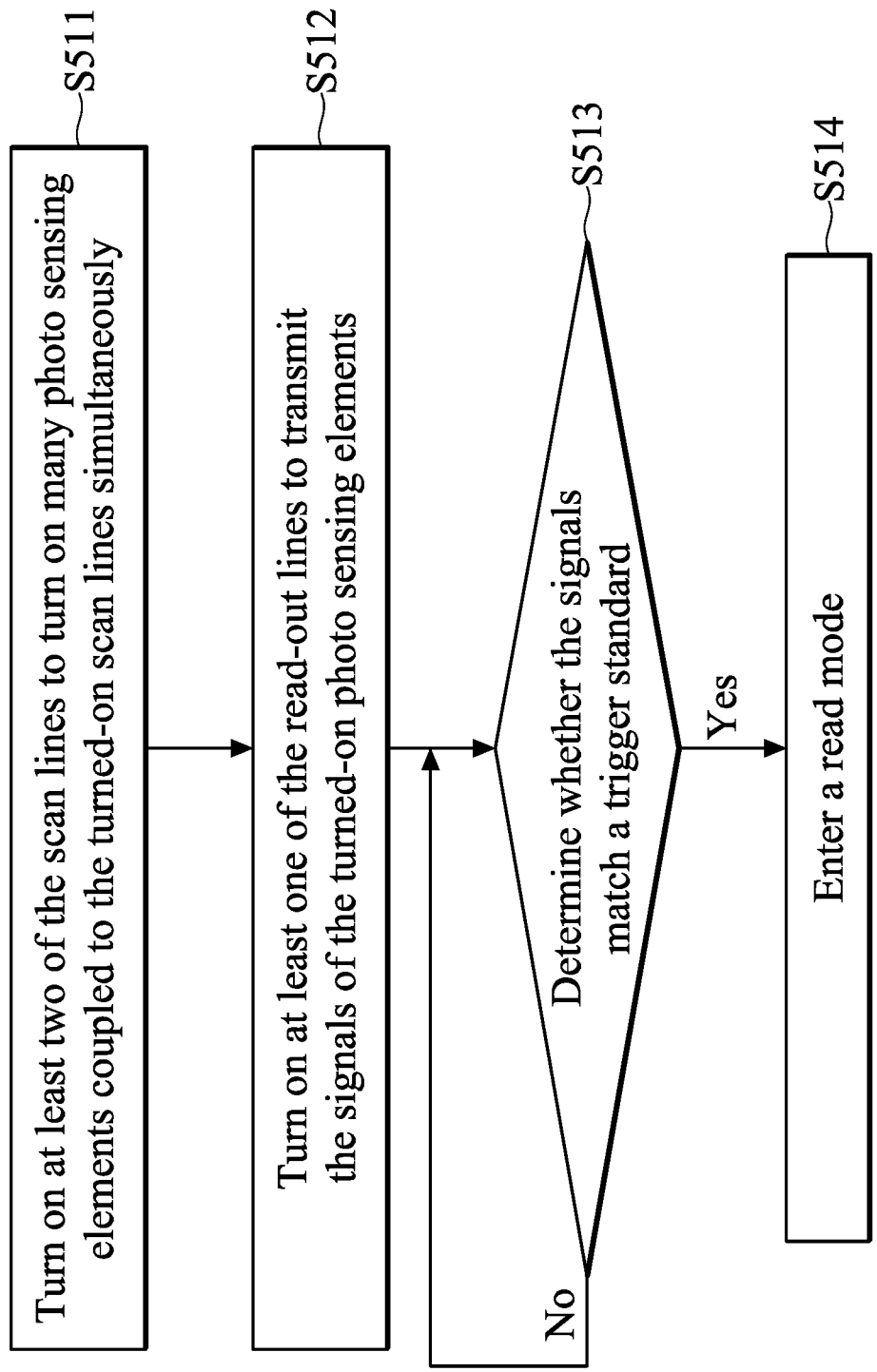
FIG. 7 is a flowchart of an exemplary embodiment of a light-detection method, according to various aspects of the present disclosure.

FIG. 7 is a flowchart of an exemplary embodiment of a light-detection method, according to various aspects of the present disclosure. The light-detection method may be applied a detection panel. The detection panel may comprise a plurality of scan lines, a plurality of read-out lines and a plurality of photo sensing elements. The photo sensing element may be coupled to the corresponding scan line and the corresponding read-out line.

First, at least two of the scan lines are simultaneously turned on to turn on the photo sensing elements coupled to the turned-on scan lines (step S511). In some embodiments, the scan lines turned in step S511 may be turned on by the same or different scan driving circuits (e.g., the first scan driving circuit 205, the second scan driving circuit 210 and the third scan driving circuit 215 shown in FIG. 2). In some embodiments, the number of scan lines turned by one scan driving circuit may be the same as or different than the number of scan lines turned by another scan driving circuit. Taking FIG. 6 as an example, step S511 may simultaneously turn on the scan line $SL_1$, the scan line $SL_3$ and the scan line $SL_5$. In some embodiments, step S511 may simultaneously turn on the scan line $SL_1$ to the scan line $SL_6$, but the disclosure is not limited thereto.

In some embodiments, step S511 may selectively turn on specific scan line according to a setting parameter, wherein the setting parameter may relate to the intensity of the light, the direction of the light or other factors which may affect the detection result generated by the detection panel, but the disclosure is not limited thereto. Taking FIG. 1 as an example, when an external light source emits light to one detection zone (e.g., $RG_3$) in the detection panel 115, step S511 may turn on the scan lines coupled to the photo sensing elements in one detection zone (such as the detection zone $RG_3$). Additionally, when the light emitted by the external light source is weak, step S511 may turn on more scan lines, but the disclosure is not limited thereto.

Then, at least one of the read-out lines may be turned on to transmit the signals of the photo sensing elements coupled to the turned-on read-out line (step S512). For example, in step S512, the read-out line may be turned on to transmit the signals of the photo sensing elements which are turned on in step S511, but the disclosure is not limited thereto. Taking FIG. 2 as an example, assuming that the scan line $SL_1$ and the scan line $SL_2$ are simultaneously turned on in step S511 to turn on the photo sensing element $SR_{11}$ to the photo sensing element $SR_{62}$ coupled to the scan line $SL_1$ or the scan line $SL_2$. Additionally, at least one read-out line coupled to the photo sensing elements may be turned on in step S511. The read-out line may be turned on to transmit the signals of the photo sensing elements coupled to the read-out line to at least one read-out integrated circuit. In this case, step S512 may turn on the read-out line $RL_1$ and the read-out line $RL_2$ to transmit the signals of the photo sensing element $SR_{11}$, the photo sensing element $SR_{21}$, the photo sensing element $SR_{12}$ and the photo sensing element $SR_{22}$. In another embodiment, in step S512, the read-out line $RL_1$ may be turned on to transmit the signals of the photo sensing element $SR_{11}$ and the photo sensing element $SR_{12}$, but the disclosure is not limited thereto.

In some embodiments, in step S512, the number of read-out lines turned on may relate to the setting parameter. Taking FIG. 1 and FIG. 2 as an example, when an external light source emits light toward one detection zone (e.g., $RG_3$), the read-out lines (e.g., the read-out line $RL_5$ and the read-out line $RL_6$) corresponding to the detection zone $RG_3$ may be turned on in step S512. Furthermore, when the intensity of the light is strong, fewer read-out lines are turned on in step S512. When the intensity of the light is weak, more read-out lines are turned on in step S512, but the disclosure is not limited thereto.

Next, a determination is made as to whether the signal matches a trigger standard (step S513). In some embodiments, step S513 uses different trigger standard for different read-out lines. In other embodiments, step S512 may compare the signals of different read-out lines with a single trigger standard. When these signals or most of the signals matches a predetermined threshold value, it means to match the trigger standard, but the disclosure is not limited thereto. Taking FIG. 2 as an example, in the detection mode, the first processor 235 may compare the signal transmitted by the read-out line $RL_1$ with a first threshold value and compare the signal transmitted by the read-out line $RL_2$ with a second threshold value. When the signal transmitted by the read-out line $RL_1$ is greater than the first threshold value, and the signal transmitted by the read-out line $RL_2$ is greater than the second threshold value, it means to match the trigger standard, but the disclosure is not limited thereto. In some embodiments, the first threshold value may be the same as or different from the second threshold value. The trigger standard may be changed according to the sizes of different target objects or the positions of the photo sensing elements in the detection panel, but the disclosure is not limited thereto.

In some embodiments, the trigger standard means that the number of read-out lines is larger than a predetermined number, wherein signals transmitted by the read-out lines are larger than the threshold values. Taking FIG. 2 as an example, the first processor 235 may receive the signals of the photo sensing elements corresponding to the read-out line $RL_1$, the read-out line $RL_2$, the read-out line $RL_5$ and the read-out line $RL_6$ through the read-out line $RL_1$, the read-out line $RL_2$, the read-out line $RL_5$ and the read-out line $RL_6$, and the signals corresponding to different read-out lines may accumulate. In one embodiment, the first processor 235 may accumulate the signals transmitted by one read-out line to generate a signal value. The first processor 235 determines whether the signal value is greater than a predetermined threshold value. The first processor 235 determines whether the number of the signal values greater than the corresponding predetermined threshold values matches a trigger standard. Furthermore, the predetermined threshold values for different read-out lines may be the same as or different. The predetermined threshold values may be different according to the positions of the read-out lines turned on or the number of photo sensing elements turned on, but the disclosure is not limited thereto. In some embodiments, the trigger standard may be that the signals transmitted by at least three read-out lines are greater than the threshold values. When the signals transmitted by at least three read-out lines may be accumulated respectively, and the accumulated results may be greater than the predetermined threshold values, it means to match the trigger standard. When number of accumulated results greater than the predetermined threshold values is less than 3, it means that the trigger standard is not matched.

When the trigger standard is not matched, step S511 is performed to enter the detection action again. Since the detection action has been described, the description of the detection action is omitted. However, when the trigger standard is matched, a read mode may be entered (step S514). In the read mode, the scan lines are turned on sequentially according to a control clock to read the signals of corresponding photo sensing elements. Taking FIG. 2 as an example, the first control unit 105 may sequentially turn on the scan line $SL_1$ to the scan line $SL_6$, but the disclosure is not limited thereto.

In some embodiments, before entering the read mode, the second control unit 110 may wait a buffer time to confirm the detection action is finished. When the detection action is finished, a read action is performed. As discussed above, the duration of the buffer time may be between 1 ms to 10 seconds (1 ms≤buffer time≤10 seconds) in some embodiments. In some embodiments, the duration of the buffer time may be between 1 ms to 3 seconds (1 ms≤buffer time≤3 seconds). In some embodiments, before entering the read mode, the second control unit 110 does not wait a buffer time, but the disclosure is not limited thereto.

Since the light-detection method of the present disclosure is applied to detect and determine whether the photo sensing elements disposed on the detection panel are emitted by light, and no additional photo sensing elements are required. In the detection mode, at least two of the scan lines are selectively and simultaneously turned on or at least one read-out line is selectively turned on to transmit the signals of the photo sensing elements coupled to the corresponding read-out line. The scan lines are not required to be turned on in the detection mode. The time required for the detection mode and the power consumption of the light-detection device can be reduced.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While the disclosure has been described by way of example and in terms of the preferred embodiments, it is to be understood that the disclosure is not limited to the disclosed embodiments. On the contrary, it is intended to cover various modifications and similar arrangements (as would be apparent to those skilled in the art). For example, it should be understood that the system, device and method may be realized in software, hardware, firmware, or any combination thereof. Therefore, the scope of the appended claims should be accorded the broadest interpretation so as to encompass all such modifications and similar arrangements.

What is claimed is:

1. A light-detection method for a light-detection device comprising a plurality of scan lines, a plurality of read-out lines and a plurality of photo sensing elements, wherein one of the plurality of photo sensing elements is coupled to one of the plurality of scan lines and one of plurality of the read-out lines, the method comprising:
   reading a setting parameter;
   simultaneously turning on at least two of the plurality of scan lines to turn on a portion of the plurality of photo sensing elements coupled to the turned-on scan lines;
   turning on at least one of the plurality of read-out lines to transmit signals of the portion of the plurality of photo sensing elements;
   determining whether the signals match a trigger standard; and
   entering a reading mode in response to the signals matching the trigger standard,
   wherein:
   in response to the setting parameter having been set to a first value, the number of turned-on scan line is a first numerical value,
   in response to the setting parameter having been set to a second value, the number of turned-on scan line is a second numerical value,
   the first numerical value is higher than the second numerical value.

2. The light-detection method as claimed in claim 1, wherein the light-detection device further comprises a plurality of scan driving circuits, and one of the plurality of scan driving circuits is coupled to a portion of the plurality of scan lines,
   wherein in the step of simultaneously turning on the at least two of the plurality of scan lines, at least two of the plurality of scan driving circuits simultaneously turn on at least one of the plurality of scan lines coupled to the at least two of the plurality of scan driving circuits.

3. The light-detection method as claimed in claim 1, wherein the light-detection device further comprises a plurality of scan driving circuits, and one of the plurality of scan driving circuits is coupled to a portion of the plurality of scan lines;
   wherein in the step of simultaneously turning on at least two of the plurality of scan lines, at least two of the plurality of scan driving circuits respectively turn on at least two of the plurality of scan lines coupled to the at least two of the plurality of scan driving circuits.

4. The light-detection method as claimed in claim 1, wherein the light-detection device further comprises a plurality of read-out integrated circuits, and one of the read-out integrated circuits is coupled to a portion of the plurality of read-out lines, and
   wherein in the step of turning on the at least one of the plurality of read-out lines, one of the plurality of read-out integrated circuits turns on a portion of the at least one of the plurality of the read-out lines coupled to the one of the plurality of read-out integrated circuits.

5. The light-detection method as claimed in claim 1, further comprising:
   waiting a buffer time before entering the reading mode in response to the signals matching the trigger standard.

6. The light-detection method as claimed in claim 5, wherein a duration of the buffer time is between 1 milliseconds to 10 seconds.

7. The light-detection method as claimed in claim 1, further comprising:
   performing a compensation action.

8. The light-detection method as claimed in claim 1, further comprising:
   performing a discharge action before the read mode, wherein:
   the discharge action is to discharge the electric charges in the plurality of photo sensing elements to ground.

9. A light-detection device comprising:
   a plurality of detection zones, at least one of the plurality of detection zones comprising a plurality of photo sensing elements configured to detect a light;
   a first control unit coupled to the plurality of photo sensing elements; and
   a second control unit coupled to the plurality of photo sensing elements,
   wherein in a detection mode, the first control unit simultaneously turns on at least one of the plurality of photo sensing elements in the at least one of the plurality of detection zones according to a setting parameter, and the second control unit reads signal of the at least one of the plurality of photo sensing elements turned on by the first control unit,
   wherein the second control unit determines whether the signal of the at least one of the plurality of photo sensing elements turned on by the first control unit matches a trigger standard,
   wherein:
   in response to the setting parameter having been set to a first value, the number of turned-on photo sensing elements is a first numerical value,
   in response to the setting parameter having been set to a second value, the number of turned-on photo sensing elements is a second numerical value,
   the first numerical value is higher than the second numerical value.

10. The light-detection device as claimed in claim 9, further comprising:
    a plurality of scan lines coupled to the first control unit; and
    a plurality of read-out lines coupled to the second control unit, wherein one of the plurality of photo sensing elements is coupled to one of the plurality of scan lines and one of the plurality of read-out lines, wherein in the detection mode, the first control unit simultaneously turns on at least two of the plurality of scan lines to turn on a portion of the plurality of photo sensing elements coupled to the turned-on scan lines.

11. The light-detection device as claimed in claim 10, wherein the first control unit comprises:
a first scan driving circuit coupled to a plurality of first scan lines of the plurality of scan lines; and
a second scan driving circuit coupled to a plurality of second scan lines of the plurality of scan lines,
wherein in the detection mode, the first scan driving circuit turns on at least one of the plurality of first scan lines, and the second driving circuit turns on at least one of the plurality of second scan lines.

12. The light-detection device as claimed in claim 9, wherein the second control unit comprises a first processor coupled to the plurality of read-out lines, and in response to the signals of the turned-on photo sensing elements matching the trigger standard, the first processor sequentially turns on the plurality of read-out lines.

13. The light-detection device as claimed in claim 11, wherein the second control unit comprises a first processor coupled to the plurality of read-out lines, and in response to the signals of the turned-on photo sensing elements matching the trigger standard, the first processor controls the first scan driving circuit to turn on the corresponding scan lines after a buffer time.

14. The light-detection method as claimed in claim 13, wherein a duration of the buffer time is between 1 millisecond to 10 seconds.

15. The light-detection device as claimed in claim 9, wherein the second control unit comprises at least one storage element, and the storage element include a non-volatile storage element.

16. The light-detection device as claimed in claim 15, wherein a write cycle time of the at least one storage element is less than or equal to 50 ns.

17. The light-detection device as claimed in claim 9, wherein the light-detection device is a X-ray flat panel detection.

18. A light-detection device comprising:
a detection panel; and
a control unit coupled to the detection panel and comprising a processor and a storage element coupled to the processor,
wherein the storage element has non-volatile properties and write cycle time of the storage element is less than or equal to 50 ns,
wherein:
the detection panel comprises a plurality of photo sensing elements,
the control unit simultaneously turns on at least one of the plurality of photo sensing elements according to a setting parameter, reads signal of at least one of turned-on photo sensing elements and determines whether the signal of at least one of the plurality of photo sensing elements matches a trigger standard,
in response to the setting parameter having been set to a first value, the number of turned-on photo sensing elements is a first numerical value,
in response to the setting parameter having been set to a second value, the number of turned-on photo sensing elements is a second numerical value,
the first numerical value is higher than the second numerical value.

19. The light-detection device as claimed in claim 18, wherein the processor comprises a graphics processing unit.

* * * * *